US008461233B2

(12) United States Patent
Weerawarna et al.

(10) Patent No.: US 8,461,233 B2
(45) Date of Patent: Jun. 11, 2013

(54) FIBER FOR FIBER CEMENT AND RESULTING PRODUCT

(75) Inventors: S. Ananda Weerawarna, Seattle, WA (US); Harshadkumar M. Shah, Bonney Lake, WA (US)

(73) Assignee: Weyerhaeuser NR Company, Federal Way, WA (US)

( * ) Notice: Subject to any disclaimer, the term of this patent is extended or adjusted under 35 U.S.C. 154(b) by 0 days.

(21) Appl. No.: 13/495,692

(22) Filed: Jun. 13, 2012

(65) Prior Publication Data

US 2013/0005859 A1 Jan. 3, 2013

Related U.S. Application Data

(60) Provisional application No. 61/503,528, filed on Jun. 30, 2011.

(51) Int. Cl.
*C04B 28/02* (2006.01)
*C04B 16/02* (2006.01)

(52) U.S. Cl.
USPC .............................................. 524/7; 106/805

(58) Field of Classification Search
USPC .............................................. 524/7; 106/805
See application file for complete search history.

(56) References Cited

U.S. PATENT DOCUMENTS

| 5,667,637 | A | 9/1997 | Jewell et al. | |
|---|---|---|---|---|
| 6,524,348 | B1 | 2/2003 | Jewell et al. | |
| 2010/0162926 | A1* | 7/2010 | Thomson et al. | 106/805 |
| 2010/0300330 | A1* | 12/2010 | Hamilton et al. | 106/805 |

FOREIGN PATENT DOCUMENTS

| WO | 9716595 A1 | 5/1997 | |
|---|---|---|---|
| WO | WO 01-29309 | * | 4/2001 |

* cited by examiner

*Primary Examiner* — John Uselding
(74) *Attorney, Agent, or Firm* — Weyerhaeuser Law Department

(57) ABSTRACT

A fiber-cement product which includes a treated cellulose wood pulp fiber. The fiber is treated with fibrillated carboxymethyl cellulose or a carboxyethyl cellulose and poly (diallyldimethyl ammonium)chloride. The fiber can be bleached or partially bleached, refined or unrefined or a mixture of refined and unrefined fiber.

6 Claims, 11 Drawing Sheets

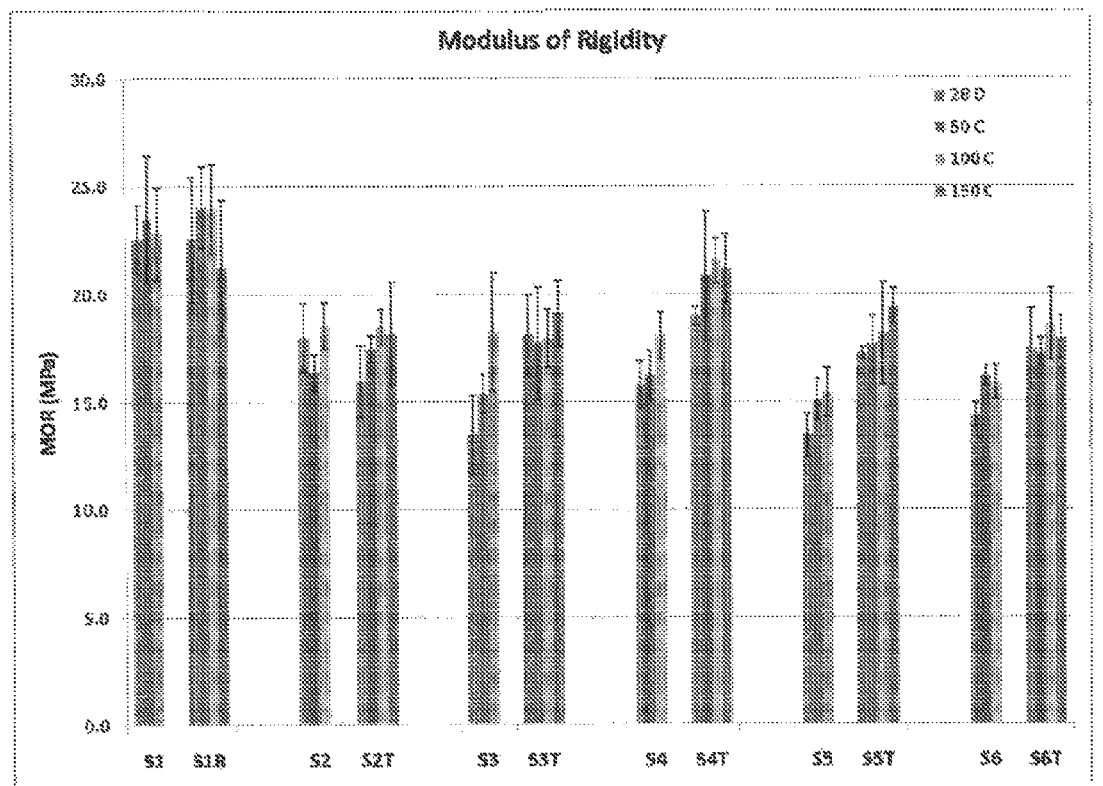
Figure 10 – Strength Results

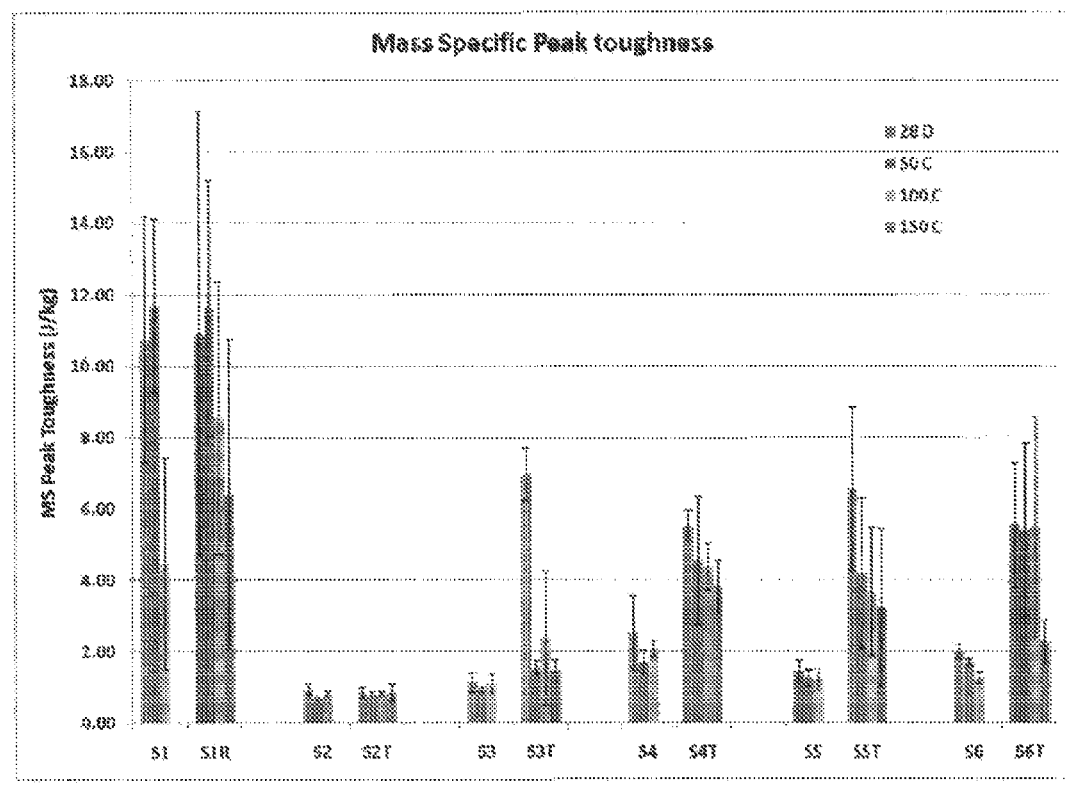
Figure 11 – Mass Specific Toughness Results at Peak Load on Test Sample

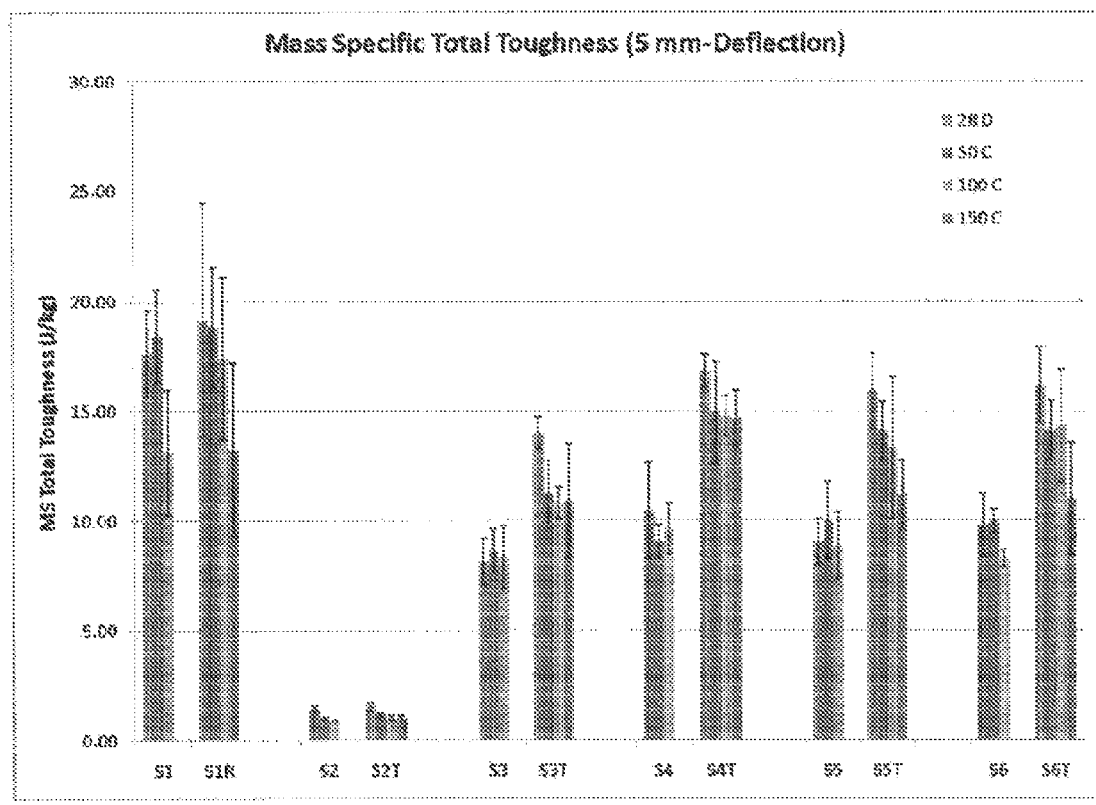

FIBER FOR FIBER CEMENT AND RESULTING PRODUCT

CROSS-REFERENCE TO RELATED APPLICATION

This application is entitled to and claims the benefit of priority under 35 U.S.C. §119 from U.S. Provisional Patent Application Ser. No. 61/503,528 filed Jun. 30, 2011, and titled FIBER FOR FIBER CEMENT AND RESULTING PRODUCT the contents of which are incorporated herein by reference.

FIELD OF THE INVENTION

This relates to fibers for use in fiber cement products and the resulting fiber cement products.

BACKGROUND

The internal structures of houses and other buildings are commonly protected from environmental elements by exterior siding, roofing and trim materials. These siding, roofing and trim materials are typically planks, panels or shingles composed of wood, concrete, brick, aluminum, stucco, wood composites, or fiber-cement composites. Some common fiber-cement composites are fiber-cement siding, roofing, and trim which are generally composed of cement and unbleached wood pulp, and, optionally, silica sand, synthetic fibers and various additives. Fiber-cement products offer several advantages over other types of materials, such as wood siding, roofing and trim because fiber-cement products are weatherproof, relatively inexpensive to manufacture, fire-resistant, and invulnerable to rotting or insect damage.

Most commercial fiber-reinforced cement siding products are made using the Hatschek process. The Hatschek process was initially developed for the production of asbestos cement composites, but is now also used for the manufacture of non-asbestos, synthetic and cellulose fiber reinforced cement composites. Non Asbestos, air cured fiber cement products require synthetic fibers as reinforcing fibers and refined cellulose or equivalent fibers as filtration fibers. Synthetic fibers alone cannot perform the filtration function and therefore require the addition of cellulose fibers for this purpose.

In the Hatschek process, bales of bleached or unbleached cellulose pulp fibers are re-pulped in water to provide substantially singulated fibers. The re-pulped fibers are refined and then mixed with cement and additives such as calcite, and optionally synthetic fibers, silica sand, clay, and other additives to form a mixture. The type of additive will depend, in part, on the type of curing that will be used. An air-cure or natural curing process will often use calcite, calcium carbonate, as an additive and synthetic fibers like polyvinyl alcohol (PVA) fibers as reinforcing fibers. An autoclave curing process will usually use silica sand as an additive.

A thin layer of fiber-cement mixture is deposited on a felt band substrate and vacuum dewatered. This process is repeated until a number of layers are formed to obtain the final thickness and to provide a layered product. Depending on the desired product and specification the product may then be pressed. The product is then cured to form a fiber reinforced cement matrix in sheet form. The curing may be accomplished by air drying or natural curing in a humid environment, or through autoclaving. A natural curing process may take 21 to 28 days. It can be accelerated by the addition of a high humidity environment at elevated temperature not higher than 80° C. The material may be used for siding, roofing or trim. The siding form may have the appearance of standard beveled wood siding. The roofing form may have the appearance of standard roofing materials such as shingles, tile, slate or full profiled sheets.

In the original Hatschek process asbestos fibers were the fibers of choice. In natural curing asbestos fibers acted as both a reinforcing fiber and as the filtration fiber. A filtration fiber acts as a filter medium in the cement mixture slurry during the drainage process on the forming or sieve wire (also known as sieve cylinder) to help retain cement and additive particles while the excess water is being removed from the cement suspension. If there is no filter medium then a great deal of the solids from the slurry will be lost with the water during the drainage process. The purpose of the filter medium is to retain the cement mixture within the product while removing the water. The cement mixture will form around and attach to the fibers during the drainage process. Filtration fibers aid drainage by trapping particles of cement and other ingredients in the cement mix without greatly slowing down the formation process on the wire.

The fiber cement board manufacturers target high strength combined with good flexibility in the cement board. These properties are usually measured by a 3-Point Flexure test (similar to ASTM C-1185). Strength is indicated by the modulus of rupture (MOR) of the board. Flexibility is shown by the deflection of the board at maximum load. Maximum load is the amount of force that can be applied to the board before it breaks. Deflection at maximum load is how far the board deflects from the horizontal plane of the board before breaking in 3-Point bending. These measurements are illustrated in FIG. 1.

The asbestos fibers primary function was to reinforce the composite while aiding in the filtration process during manufacture of the board. Health and safety issues are eliminating asbestos fibers from use in fiber cement manufacture. Synthetic fibers, such as polyvinyl alcohol (PVA) fibers have replaced asbestos fibers. Synthetic fibers, however, do not act as filtration fibers. Synthetic fibers do not deter or prevent the cementitious material from passing through the wire with the water. Consequently, highly beaten and highly fibrillated, usually unbleached, cellulose fiber has been combined with synthetic fiber to provide filtration capability For naturally cured fiber cement board, PVA reinforcement fibers in combination with highly refined cellulose fibers have been used in place of asbestos fibers. PVA fibers may be used to improve the toughness (calculated by dividing the energy to break by the volume of the board in 3-Point bending test) of the cement product. The PVA fibers provide acceptable modulus of rupture, maximum load and deflection at maximum load. The highly refined cellulose fibers provide filtration. A typical fiber amount is 4 to 5% by weight refined cellulose wood pulp fibers and 1.5 to 3% by weight PVA fibers. The weight percent is based on the dry weight of the ingredients for the cement product, including the fiber, and indicates the amount of fiber in the cement mix.

The replacement of asbestos fibers with highly beaten cellulose fibers as the filtration fiber may require the use of flocculants as one of the additives. The natural affinity of cellulose fibers for the minerals used in fiber cement manufacture is much lower than asbestos. Therefore, flocculants are required for mineral retention, dewatering, formation and machine efficiency. Flocculent selection and optimization formulations are considered to be a competitive advantage by fiber cement manufacturers and kept by each as a trade secret. The typical flocculants are anionic polyacrylamides or phenol-formaldehyde resin and poly(ethylene oxide).

Other commonly used fiber cement manufacturing processes known to those skilled in the art and which use PVA fibers are: the Magnani process, extrusion, injection molding, hand lay-up, molding and the Mazza pipe process.

A drawback to the use of PVA fibers is the high cost of the fibers and the potential lack of availability of the fiber, as well as their inability to filter the slurry in the process causing major solids loss if filtration fibers such as highly refined cellulose fibers were not used in combination with the PVA fibers.

Other fibers must be comparable with PVA/wood pulp fiber mixes in terms of toughness, modulus of rupture, maximum load and deflection at maximum load and, filtration if they are to be considered for use in fiber cement board.

DRAWINGS

FIG. 10 is a graph showing the modulus of rigidity for several samples

FIG. 11 is a graph showing the mass specific peak toughness of several samples.

FIG. 12 is a graph showing the mass specific total toughness of several samples.

DETAILED DESCRIPTION

It was found that poly(diallyldimethyl ammonium)chloride (poly DADMAC) polymer can be tightly bound on the surface of cellulose fibers when the fibers are first treated with a low DS (degree of substitution=0.05-0.45) fibrillated carboxyalkyl cellulose dispersion. The degree of substitution is the average number of moles of hydroxyl groups in the cellulose polymer that are transformed to provide the cellulose derivative. The carboxyalkyl cellulose may be carboxymethyl cellulose (CMC) or carboxyethyl cellulose. Carboxymethyl cellulose with DS less than about 0.45 is not soluble in water and can be fibrillated by high shear blending in water. Carboxyethyl cellulose with a DS less than about 0.45 is not soluble in water and can be fibrillated by high shear blending in water.

The fibrillated carboxyalkyl cellulose is made by applying a high shear force on carboxyalkyl cellulose fibers having a DS of 0.01 to 0.45 in water to pull apart the carboxyalkyl cellulose fibers into fibrillated material. The energy applied and the method of fibrillation determines the level of fibrillation. Low energy fibrillation of low DS carboxyalkyl cellulose fibers first form fragmented sheets or other aggregates of nano and micro fibrils. High energy fibrillation forms singulated nano and micro fibrils. Singulated nano or micro fibrils or fragmented sheets or other aggregates of entangled nano or micro fibrils (hereafter also called elements) are suitable for treatment of cellulose fibers to modify the cellulose fiber surface for strong binding of poly(diallyldimethyl ammonium)chloride (poly DADMAC) polymer. The fibrillated carboxyalkyl cellulose having a DS of 0.01 to 0.45 may have one or more of these elements. The elements may also be attached to each other.

Figure 1:
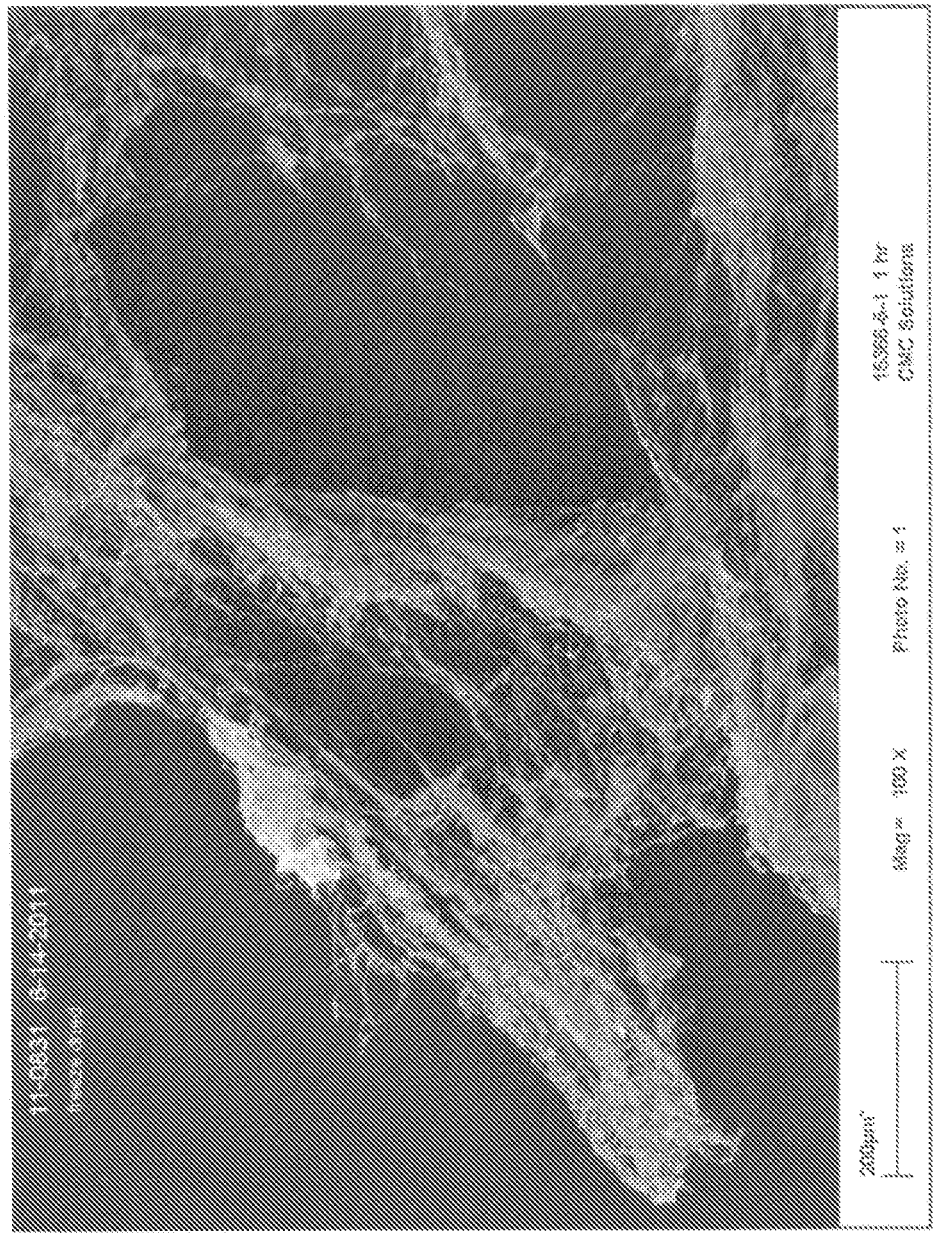
FIGS. 1-3 are photomicrographs of a sample of fibrillated carboxymethyl cellulose at magnifications of 100 times, 1000 times and 10,000 times respectively.
Figure 2:
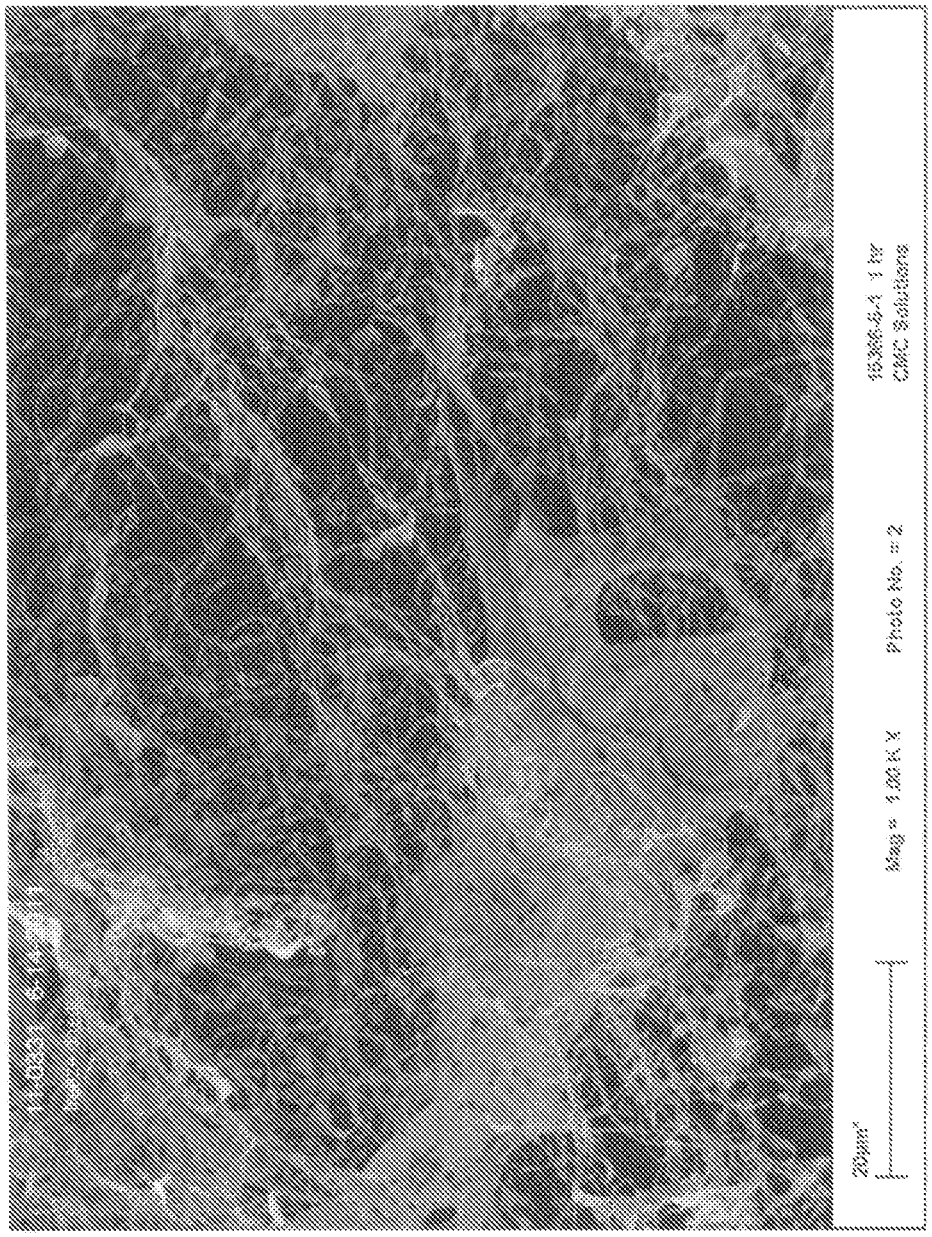
Figure 3:
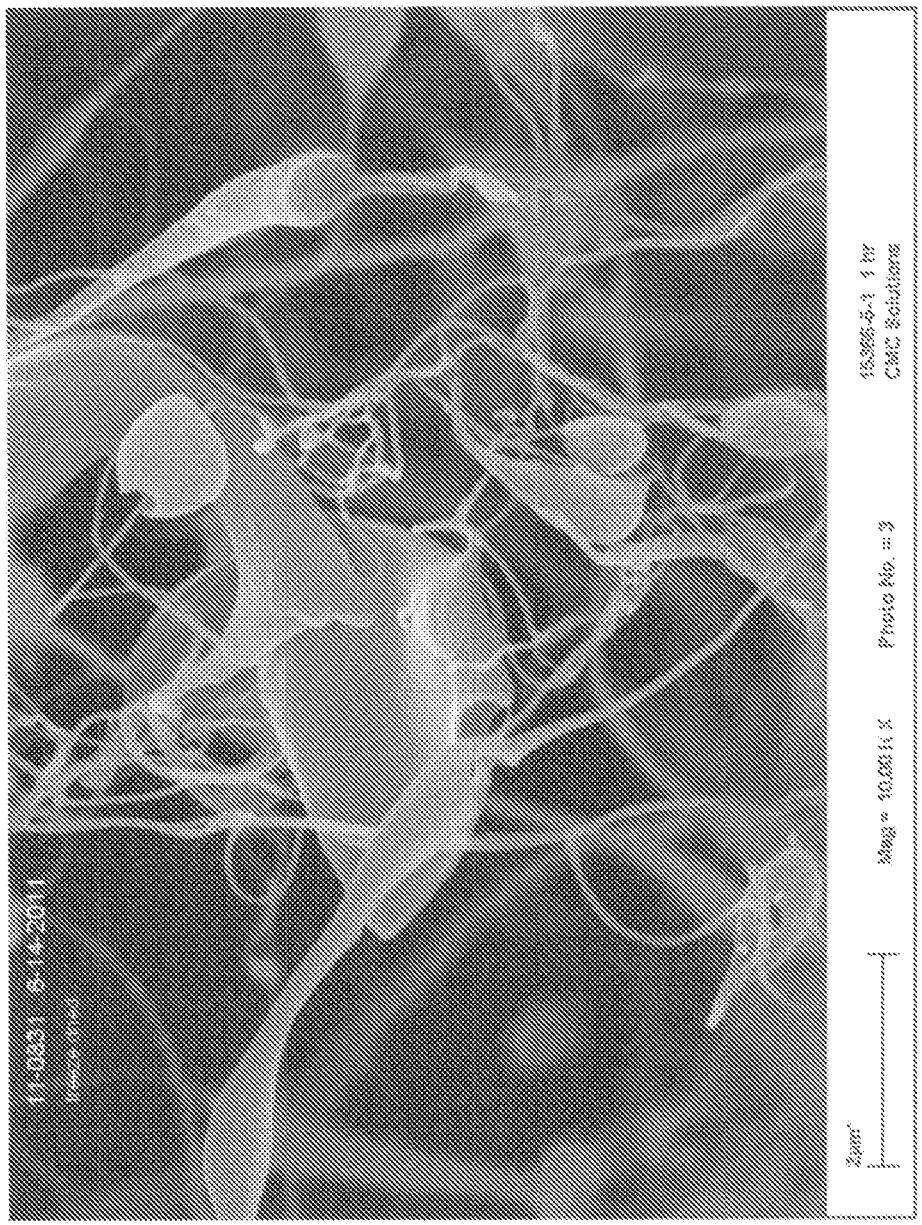
Figure 4:
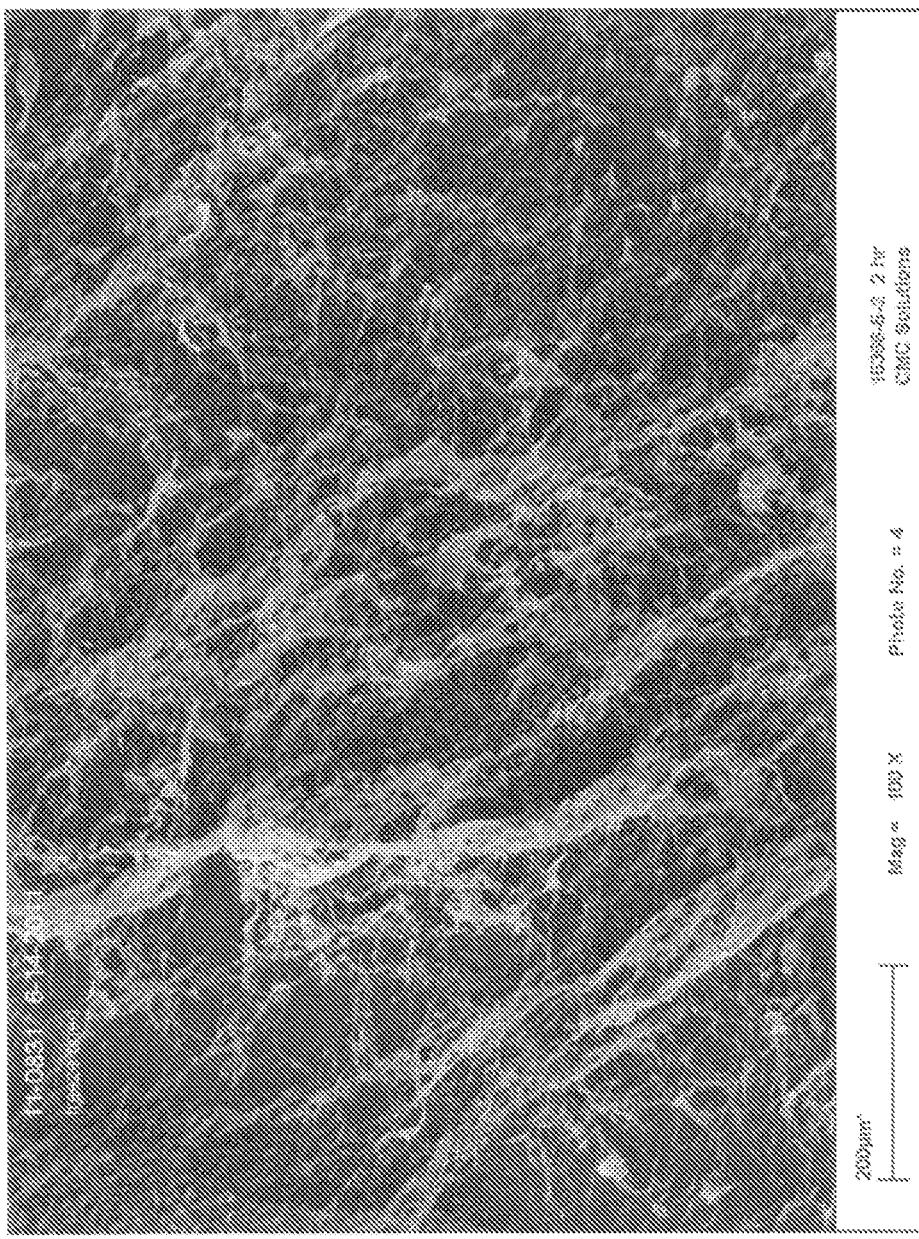
FIGS. 4-6 are photomicrographs of a another sample of fibrillated carboxymethyl cellulose at magnifications of 100 times, 1000 times and 10,000 times respectively.
Figure 5:
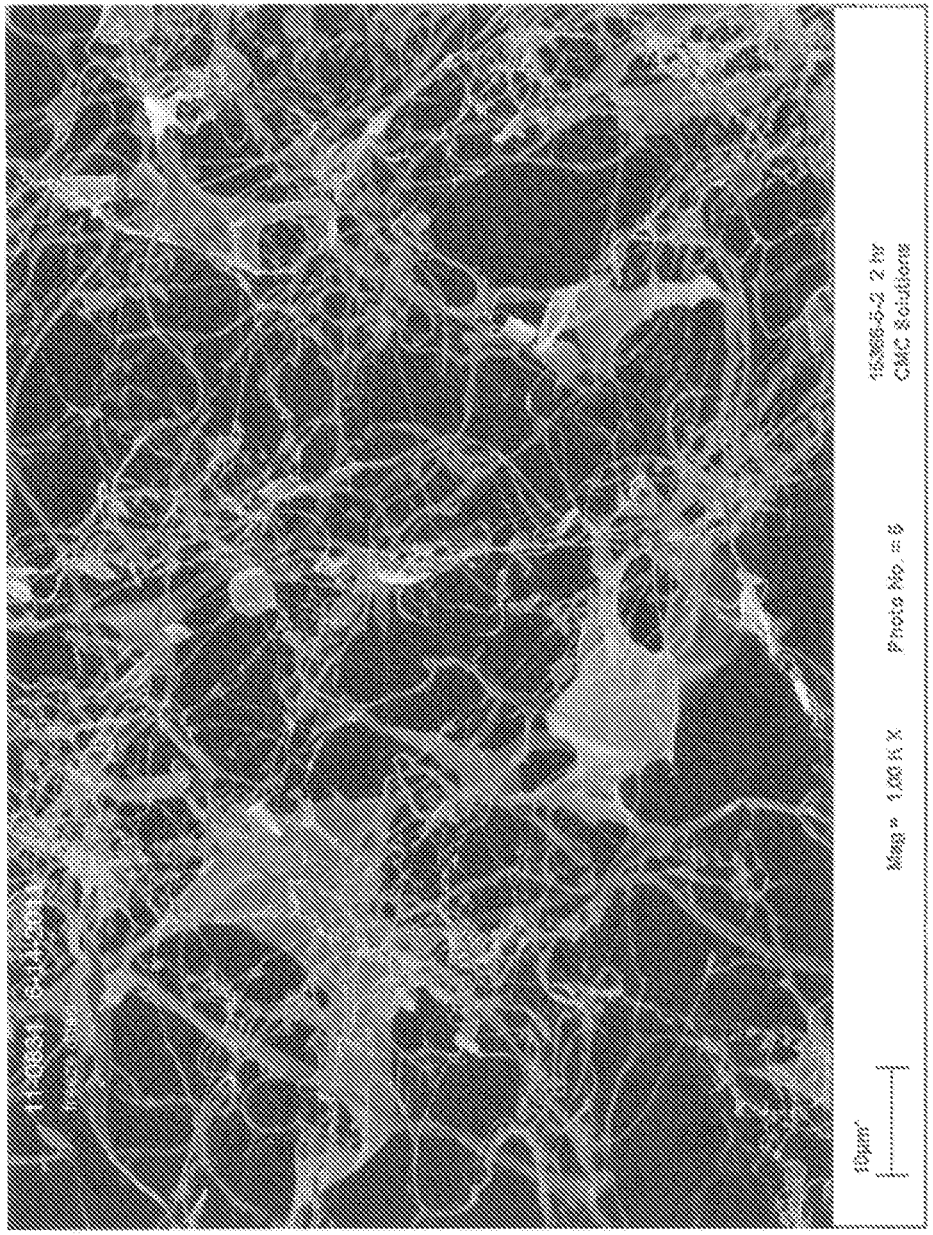
Figure 6:
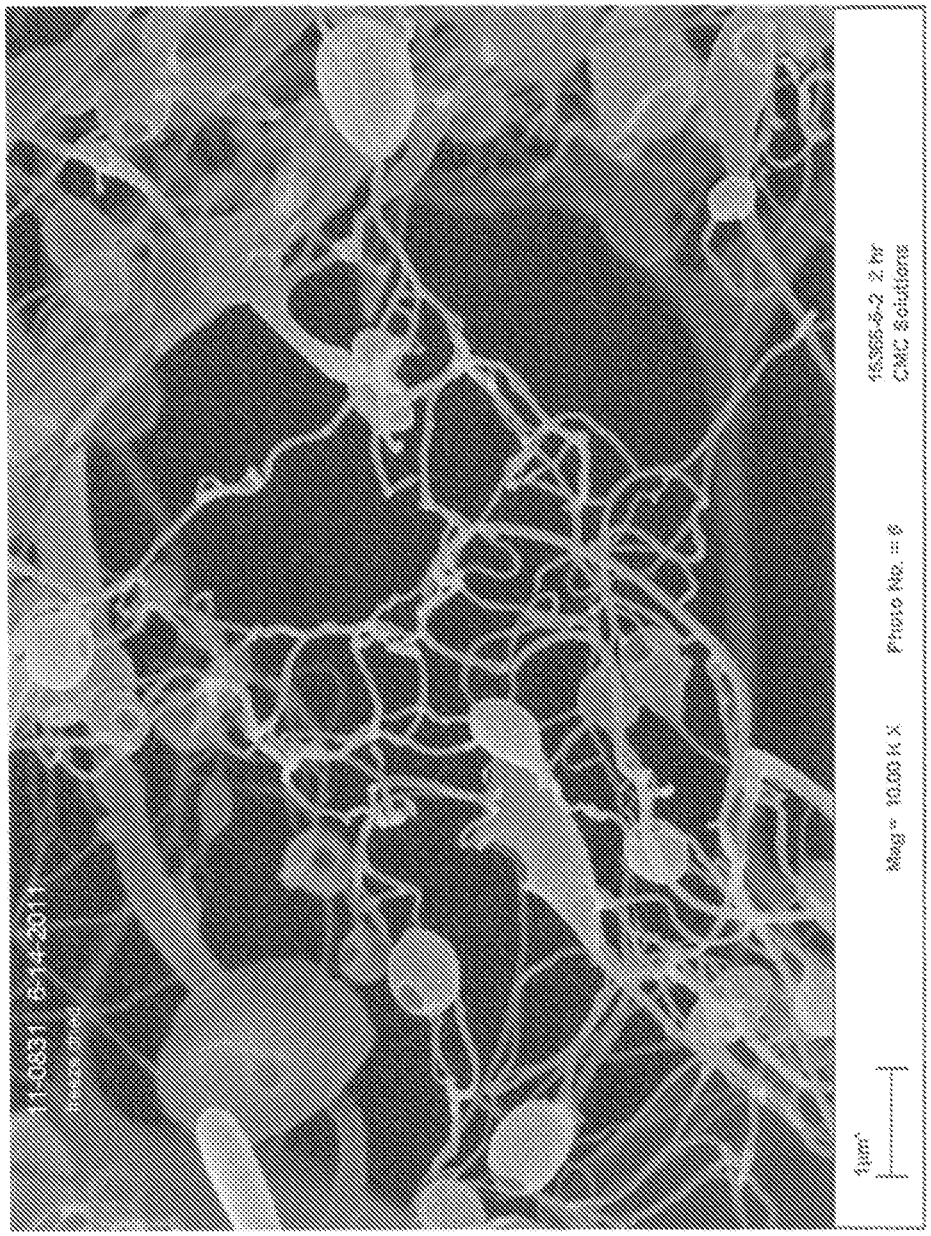

The nano and micro size refers to the width of the fibril. Nano fibrils by definition are below 100 nm in width. Micro fibrils range from 100 nm to 4000 nm in width. The carboxyalkyl material is pulled apart into fibrils having a high aspect ratio of width to length. The fibrils can be interconnected to form a web-like material. Typical fibrillated low DS carboxymethyl cellulose is shown in FIG. 1. We can use the SEMs used for the other application.

Low DS carboxyalkyl cellulose is fibrillated using high shear mixing in water. Hydropulper, homogenizer, microfuidizer or other high shear fibrillating equipment are suitable for fibrillating low DS carboxyalkyl cellulose. Cellulose fiber is then slurried in water and mixed with fibrillated low DS carboxyalkyl cellulose 0.1% to 10% by weight of cellulose fibers for 1 minute to 2 hours at a temperature of 20 to 80° C. Poly(diallyldimethyl ammonium)chloride (poly DADMAC) polymer 0.1 to 10% by weight of cellulose fibers is then mixed with cellulose fibers treated with fibrillated low DS carboxyalkyl cellulose for 1 minute to 2 hours at a temperature of 20 to 80° C.

Poly(diallyldimethyl ammonium)chloride (poly DADMAC) polymer is tightly bound on the fibrillated low DS carboxyalkyl cellulose treated cellulose fibers and the extractability of the quaternary ammonium polymer by the alkaline medium of the cement matrix is very low. Refined and non refined cellulose fibers treated in this manner when used with synthetic polymers such as polypropylene fibers improves the durability of cellulose fibers in naturally cured fiber cement boards as indicated by durable toughness after accelerated weathering cycles. Other suitable quaternary ammonium polymers may also be used in place of poly(diallyldimethyl ammonium)chloride (poly DADMAC) polymer. Not limiting to any single mechanism, one possible mechanism is the inhibition of calcification within the cellulose fibers by the anion exchange ability of the quaternary ammonium polymer tightly bound on the surface of cellulose fibers.

The samples shown in Table 1 were tested for modulus of rigidity, mass specific peak toughness and mass specific total toughness,

TABLE 1

Sample Definition

| | Reinforcing Fibers | | | Filtration Fibers | | | |
| --- | --- | --- | --- | --- | --- | --- | --- |
| Sample | PVA wt % | PP wt % | CFTH wt % | FF wt % | FFT wt % | Cement wt % | CaCO3 wt % |
| S1 | 3.0% | | | 4.0% | | 77.0% | 16.0% |
| S1R | 3.0% | | | 4.0% | | 77.0% | 16.0% |
| S2 | | | | 4.0% | | 80.0% | 16.0% |
| S2T | | | | | 4.0% | 80.0% | 16.0% |
| S3 | | 1.5% | | 4.0% | | 78.5% | 16.0% |
| S3T | | 1.5% | | | 4.0% | 78.5% | 16.0% |
| S4 | | 1.5% | 4.0% | 2.0% | | 76.5% | 16.0% |
| S4T | | 1.5% | 4.0% | | 2.0% | 76.5% | 16.0% |
| S5 | | 1.5% | 3.0% | 1.0% | | 78.5% | 16.0% |
| S5T | | 1.5% | 3.0% | | 2.0% | 77.5% | 16.0% |
| S6 | | 1.5% | 4.0% | 1.0% | | 77.5% | 16.0% |
| ST6 | | 1.5% | 4.0% | | 1.0% | 77.5% | 16.0% |

PVA Synthetic unrefined fiber
PP Synthetic unrefined fiber
CFTH Treated, unrefined, unbleached cellulose fiber
FF Untreated, refined (150 CSF), unbleached cellulose fiber
FFT Treated, refined (150 CSF), unbleached cellulose fiber
Cement Cement
CaCO3 Calcium carbonate (used as a filler)

Samples made with treated filtration fibers are marked with letter T after the number. A sample with the duplicated formulation is marked with letter R after the number.

Traditionally, refined fibers (150 CSF) are used for filtration purpose to drain the process water rapidly and retain other fibers and cement in the mix during manufacturing of the fiber cement board. They do not significantly contribute in strength and toughness of the board. However, we noticed significant improvement in strength and toughness of the board when filtration fibers were treated (sample S4 and S6).

Unrefined cellulose fibers can partially replace costly synthetic fibers. However, to retain the strength and toughness of a board over a longer period of time, it is best to treat these cellulose fibers with previously described treatment. With added contribution from treated refined fibers, the sample S4T had results comparable to the S1 boards made with expensive PVA (synthetic) fibers after ageing. Also, note that samples S3 through S6 had used less expensive polypropylene fibers in half the amount of PVA fibers used in the sample S1.

In addition, samples S4 through S6 used half the amount of refined filtration fibers. The similar filtration performance we noticed might be due to some filtration contribution provided by unrefined cellulose fibers.

At the fiber levels commonly used in the naturally cured fiber cement board industry, our treatment of unrefined, unbleached, cellulose fibers has resulted in unique fiber that boosts performance of synthetic reinforcing fibers and provides some improvement in filtration capability. Similarly, the treatment of refined, unbleached, cellulose fibers has resulted in unique, quality filtration fiber that boosts performance of unrefined fibers in their reinforcing function.

Bleached cellulose wood pulp fibers typically have a carboxyl content of 5 or below milliequivalents per 100 g of cellulose fiber (meq/100 g). Cellulose fibers are treated with the fibrillated carboxyalkyl cellulose fibers to provide additional anionic carboxyalkyl groups on the surface of the cellulose wood pulp fiber. In one embodiment the cellulose wood pulp fiber has a total carboxyalkyl content of 10 to 40 meq/100 g. In another embodiment the cellulose wood pulp fiber has a total carboxyalkyl content of 10 to 30 meq/100 g. In another embodiment the cellulose wood pulp fiber has a total carboxyalkyl content of 10 to 20 meq/100 g.

It is also possible to have cellulose fibers carboxalkylated to a DS of about 0.01 to 0.08 and use such fibers without fibrillation to tightly bind poly(diallyldimethyl ammonium) chloride (poly DADMAC) polymer or another suitable polymeric quaternary ammonium polymer to the fiber surface. This type of modified cellulose fibers refined and non-refined also can provide durable toughness to naturally cured fiber cement boards when used with synthetic fiber such as polypropylene fibers.

It is possible to have cellulose fibers catalytically oxidized to obtain a low carboxyl level of below 30 meq/100 g of the fibers and use fibers without fibrillation to tightly bind poly (diallyldimethyl ammonium)chloride (poly DADMAC) polymer or another suitable polymeric quaternary ammonium polymer to the fiber surface. This type of modified cellulose fibers refined and non-refined also can provide durable toughness to naturally cured fiber cement boards when used with synthetic fibers such as polypropylene fibers.

Cellulose is a carbohydrate consisting of a long chain of glucose units, all β-linked through the 1-4 positions. Native plant cellulose molecules may have upwards of 2200 of the anhydroglucose units shown in FIG. 7. The number of units is normally referred to as degree of polymerization or simply D.P. Some loss of D.P. occurs during purification of the cellulose, as in using a chemical pulping process to pulp the wood to obtain the cellulose and separate it from the lignin and some of the hemicellulose in the wood. The D.P. of the final pulp will depend upon the pulping process used and the test to determine the D.P.

Figure 7:
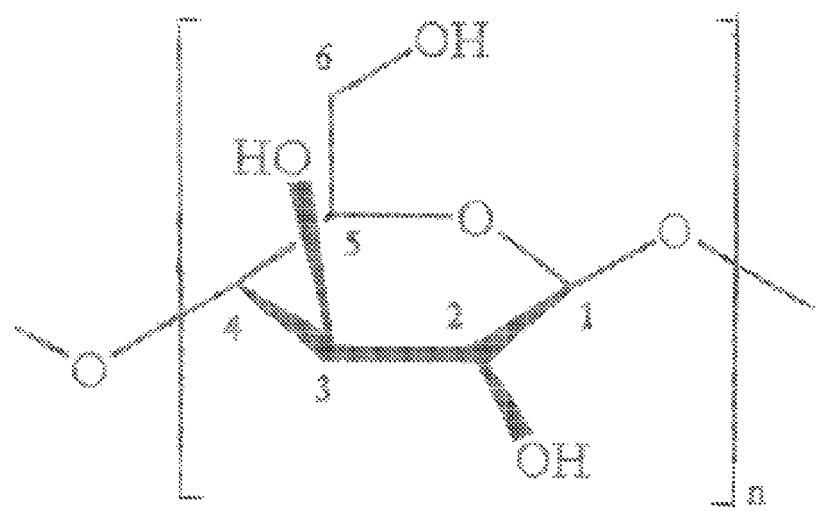
FIG. 7 is a representation of one unit of a cellulose molecule.
Figure 8:
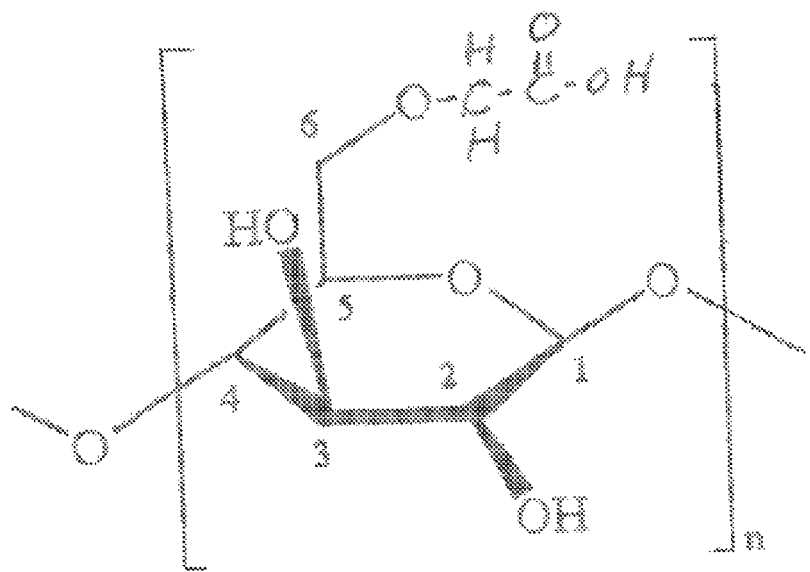
FIG. 8 is a representation of one unit of a carboxymethyl cellulose molecule.
Figure 9:
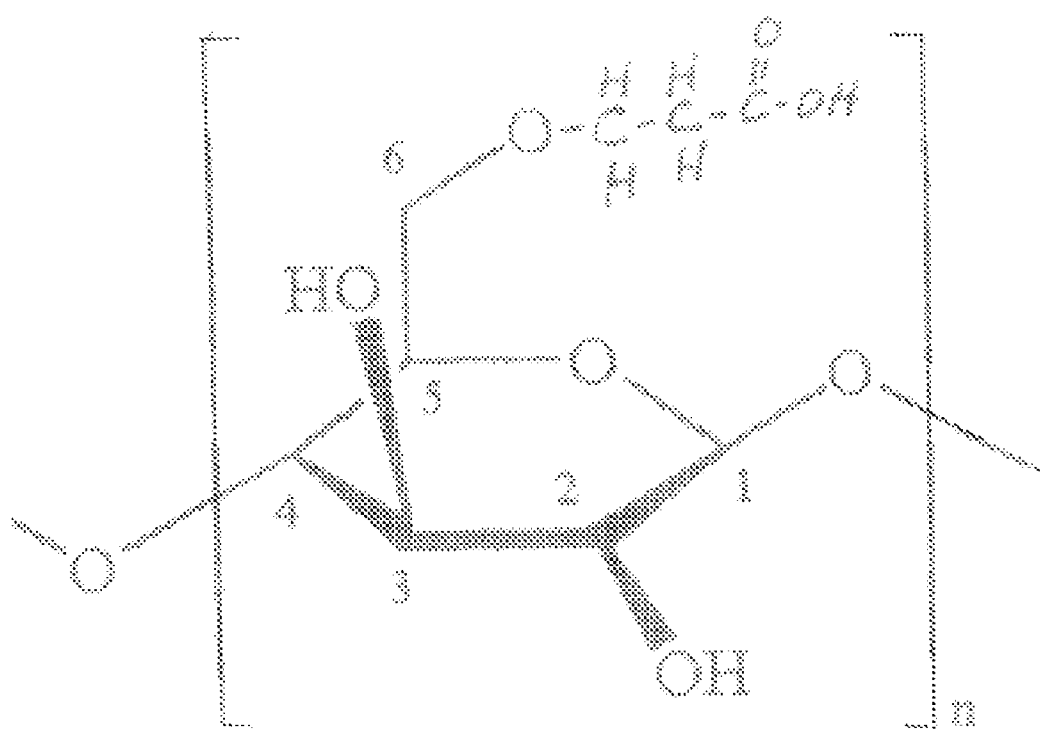
FIG. 9 is a representation of one unit of a carboxyethyl cellulose molecule.

The structure of one unit of cellulose is shown in FIG. 7 and the structures of one unit of carboxymethyl cellulose and carboxyethyl cellulose are shown in FIGS. 8 and 9. The numbers 1-6 on these diagrams are the location of carbon atoms. The carboxyalkyl cellulose may also be attached to the oxygen attached to positions 2 and/or 3 as well as position 6 or instead of position 6. Carboxyalkyl cellulose is known and the methods of making it are known.

Every anydroglucose unit of the cellulose molecule chain is not carboxylated. The carboxyalkyl content of the derivatized cellulose molecules present will be determined by the carboxyalkyl content of the carboxyalkyl cellulose fibers. The degree of substitution is the average number of moles of hydroxyl groups in the cellulose polymer that react to form the cellulose derivative.

The carboxyalkylated cellulose wood pulp fiber does not have side chains attached to the cellulose molecule through the carboxyl group.

Water insoluble low DS carboxyalkyl cellulose elements bind to the surface of cellulose fibers increasing the surface carboxyl level by about 3-25 meq/100 g. The increased carboxyl level (anionic charge) on the surface of cellulose fibers increases the level of tightly bound quaternary ammonium polymer poly DADMAC or other suitable polymeric quaternary ammonium polymer retained on the cellulose fibers and provides a modified cellulose fiber than can provide durable toughness in naturally cured fiber cement boards. The treated fibers are also less hydrophilic than untreated fibers. During fiber cement board making, these fibers increase the filtration speed of the fiber/cement slurry while retaining more solids in the formed fiber cement boards. Both refined and non refined treated cellulose fibers have these advantageous characteristics. These treated fibers can be used with synthetic fibers such as polypropylene fibers and polyvinyl alcohol fibers in fiber cement boards advantageously providing durable toughness in the naturally cured fiber cement boards.

Polymeric quaternary ammonium polymers such as Poly DADMAC (Diallyldimethyl ammonium chloride) can be tightly bound on cellulose fiber surface treated with fibrillated low DS carboxyalkyl cellulose elements. Poly DADMAC tightly bound on the surface of cellulose fibers using fibrillated low DS carboxyalkyl cellulose elements can behave as an anion exchanging surface that can be initially converted to the hydroxide form by calcium hydroxide (alkaline base present in the fiber cement slurry). This process can convert poly DADMAC bound on the surface of cellulose fibers to poly(Diallyldimethyl ammonium hydroxide) and calcium chloride during the board forming process. Water soluble salts such as calcium chloride will be removed from the wet boards during the dewatering process.

Once the fiber cement boards are dried they are subjected to accelerated aging in testing chambers or undergo aging in natural wet/dry cycles. The calcium hydroxide present in the matrix as particles (low solubility at 20° C.=0.173 g/100 mL) is gradually depleted by its reaction with dissolved atmospheric carbon dioxide that enters the fiber cement matrix via the exposed surfaces of the board under wet conditions. This reaction forms deposits of calcium carbonate in the cement matrix. Calcium carbonate has very low solubility in water (solubility at 25° C.=0.0015 g/100 mL)

When poly(Diallyldimethyl ammonium hydroxide) tightly bound to the surface of cellulose fibers via fibrillated low DS carboxyalkyl cellulose elements is exposed to dissolved atmospheric carbon dioxide, another ion exchange can take place resulting in the formation of poly(Diallyldimethyl ammonium bicarbonate).

Dissolved calcium hydroxide migrating to the treated cellulose fiber surface can then convert carbonate or bicarbonate form of the quaternary ammonium polymer to the hydroxide form and deposit calcium carbonate at the fiber/matrix interface. Until all the calcium hydroxide particles present in the matrix are depleted, these particles will gradually dissolve in water present in the matrix (rate depends on moisture content and prevailing temperature in the matrix due to seasonal variations) and will react with dissolved atmospheric carbon dioxide migrating in to the cement board. Most calcium carbonate deposits will form in the cement matrix away from the fibers. When calcium hydroxide present in the cement matrix is depleted after many years of weathering further formation of calcium carbonate is not possible.

This postulated mechanism can prevent calcium carbonate deposits being formed in the lumen or in the surface pores of cellulose fibers sequentially treated with low DS carboxyalkyl elements and a quaternary ammonium polymer. This anion exchange mechanism can prevent or decrease the tendency of cellulose fibers becoming brittle in the fiber cement boards.

The cellulose wood pulp fibers can be refined or unrefined. A combination of refined cellulose fibers and unrefined cellulose fibers treated with fibrillated low DS carboxyalkyl elements and a quaternary ammonium polymer when used with synthetic fibers such as poly propylene fibers can surprisingly improve durable toughness in the naturally cured fiber cement boards.

Experiment 1

Surface Treatment of Unbleached Cellulose Fibers

Cellulose Fibers Treated in Water
1. with fibrillated CMC fibers (0.45 DS) (4% of cellulose fiber weight) and then
2. with Poly DADMAC (100,000-200,000 Mw) (2.4% of cellulose fiber weight).

4.0 g (oven dry basis) of CMC (DS=0.45) were added to 1500 milliliters (ml) de-ionized (DI) water in a 3000 ml stainless steel beaker. The mixing resulted in the fibrillation of the CMC. The stainless steel beaker was placed in a constant temperature water bath and mixing was continued using an overhead air mixer. The mixture was mixed for one hour at 80° C.

100 g oven dry (OD) ML1 unbleached cellulose wood pulp fibers in 400 ml DI water were added to the stainless steel beaker and mixed for 30 minutes. The temperature was maintained at 80° C. during the mixing.

12.0 g of a 20% stock solution of Poly DADMAC purchased from Sigma-Aldrich (2.4 g Poly DADMAC) was diluted with 500 ml of DI water and added to the stainless steel beaker and mixed with the fiber and CMC. After one hour mixing at 80° C., the fibers were filtered using a Buchner funnel/flask under water pump vacuum. The Poly DADMAC on the fibers was determined to be 1.76% by Kjeldahl method of nitrogen determination. The elemental nitrogen content of the fiber is determined by digesting a small fiber sample in concentrated sulfuric acid. This number can be converted to the poly DADMAC % on fibers by using the % nitrogen in the elemental composition of poly DADMAC.

5.0 g of the treated wet pulp fibers was added to 5000 ml DI water and mixed for 30 minutes with overhead mixing. The fibers were filtered using a Buchner funnel/flask under water pump vacuum and the amount of Poly DADMAC on the cellulose fibers was determined to be 1.38% of the weight of the cellulose fibers by Kjeldahl method of nitrogen determination.

Another 5.0 g of the treated wet pulp fibers was added to 5000 ml of an NaOH solution (pH=12) and mixed for 30 minutes with overhead mixing. The fibers were filtered using a Buchner funnel/flask under water pump vacuum and the amount of Poly DADMAC on the cellulose fibers was determined to be 1.61% of the weight of the cellulose fibers by Kjeldahl method of nitrogen determination.

Experiment 2

Surface Treatment of Unbleached Cellulose Fibers

Cellulose Fibers Treated in Water
1. with fibrillated CMC fibers (0.45 DS) (4% of cellulose fiber weight) and then
2. with Poly DADMAC (100,000-200,000 Mw) (1.2% of cellulose fiber weight).

4.0 g (oven dry basis) of CMC (DS=0.45) was added to 1500 ml DI water in a 3000 ml stainless steel beaker. The stainless steel beaker was placed in a constant temperature water bath and mixing continued using an overhead air mixer. The CMC dispersion is heated to and maintained at 80° C. in the water bath and mixing continued for one hour.

100 g oven dry (OD) ML1 unbleached cellulose wood pulp fibers in 400 ml DI water were added to the stainless steel beaker and mixed for 30 minutes. The temperature was maintained at 80° C.

6.0 g of 20% stock solution Poly DADMAC purchased from Sigma-Aldrich (1.2 g Poly DADMAC) was diluted with 500 ml of DI water and added to the beaker. After mixing for one hour at 80° C., the fibers were filtered using a Buchner funnel/flask under water pump vacuum. The amount of Poly DADMAC on the cellulose fibers was determined to be 0.77% of the weight of the cellulose fibers by Kjeldahl method of nitrogen determination.

5.0 g of the treated wet pulp fibers was added to 5000 ml DI water and mixed for 30 minutes using overhead mixing. The fibers were filtered using a Buchner funnel/flask under water pump vacuum and the amount of Poly DADMAC on the cellulose fibers was determined to be 0.50% of the weight of the cellulose fibers by Kjeldahl method of nitrogen determination.

Another 5.0 g of the treated wet pulp fibers was added to 5000 ml of a NaOH solution (pH=12) and mixed for 30 minutes using overhead mixing. The fibers were filtered using a Buchner funnel/flask under water pump vacuum and the amount of Poly DADMAC on the cellulose fibers was determined to be 0.50% of the weight of the cellulose fibers by Kjeldahl method of nitrogen determination.

Experiment 3

Surface Treatment of Unbleached Cellulose Fibers

Cellulose Fibers Treated in Water
1. with fibrillated CMC fibers (0.45 DS) (2% of cellulose fiber weight) and then
2. with Poly DADMAC (100,000-200,000 Mw) (1.2% of cellulose fiber weight).

2.0 g (oven dry basis) of CMC (DS=0.45) was added to 1500 ml de-ionized water in a 3000 ml stainless steel beaker. The stainless steel beaker was placed in a constant temperature water bath and mixed using an overhead air mixer. The CMC dispersion was heated to and maintained at 80° C. in the water bath. Mixing was for one hour.

Then 100 g OD ML1 cellulose wood pulp fiber in 400 ml DI water was added to the stainless steel beaker and mixed for 30 minutes. The temperature was maintained at 80° C.

Then 6.0 g of 20% stock solution Poly DADMAC purchased from Sigma-Aldrich (1.2 g Poly DADMAC) diluted with 500 ml of DI water was added to the beaker and mixed for one hour. The temperature was maintained at 80° C. The fibers were filtered using a Buchner funnel/flask under water pump vacuum. The amount of Poly DADMAC on the cellulose fibers was determined to be 0.68% of the weight of the cellulose fibers by Kjeldahl method of nitrogen determination.

5.0 g of the treated wet pulp fibers was added to 5000 ml DI water and mixed for 30 minutes using an overhead mixing. The fibers were filtered. The amount of Poly DADMAC on the cellulose fibers was determined to be 0.58% of the weight of the cellulose fibers by Kjeldahl method of nitrogen determination.

Another 5.0 g of treated wet pulp fibers was added to 5000 ml of an NaOH solution (pH=12) and mixed for 30 minutes using overhead mixing. The fibers were filtered using a Buchner funnel/flask under water pump vacuum. The amount of Poly DADMAC on the cellulose fibers was determined to be 0.54% of the weight of the cellulose fibers by Kjeldahl method of nitrogen determination.

Experiment 4

Surface Treatment of Unbleached Cellulose Fibers

Cellulose Fibers Treated in Water
1. with fibrillated CMC fibers (0.45 DS) (2% of cellulose fiber weight) and then
2. with Poly DADMAC (100,000-200,000 Mw) (3.0% of cellulose fiber weight).

2.0 g (oven dry basis) of CMC (DS=0.45) was added to 1500 ml de-ionized water in a 3000 ml stainless steel beaker and mixed using an overhead air mixer. The stainless steel beaker was placed in a constant temperature water bath and mixing was continued. The CMC dispersion was heated to and maintained at a temperature of 80° C. in the water bath. The mixing was for one hour.

Then 100 g oven dry (OD) ML1 unbleached cellulose wood pulp fibers in 400 ml DI water was added to the stainless steel beaker and mixed for 30 minutes. The temperature was maintained at 80° C. during the mixing.

Then 15.0 g of 20% stock solution of Poly DADMAC (3.0 g Poly DADMAC) purchased from Sigma-Aldrich in 500 ml of DI water was added to the beaker and mixed for one hour. The temperature was maintained at 80° C. The fibers were filtered using a Buchner funnel/flask under water pump vacuum. The amount of Poly DADMAC on the cellulose fibers was determined to be 1.15% of the weight of the cellulose fibers by Kjeldahl method of nitrogen determination.

5.0 g of the treated wet pulp fibers was added to 5000 ml DI water and mixed for 30 minutes using overhead mixing. The fibers were filtered using a Buchner funnel/flask under water pump vacuum. The amount of Poly DADMAC on the cellulose fibers was determined to be 0.86% of the weight of the cellulose fibers by Kjeldahl method of nitrogen determination.

Another 5.0 g of treated wet pulp fibers was added to 5000 ml NaOH solution (pH=12) and mixed for 30 minutes using overhead mixing. The fibers were filtered using a Buchner funnel/flask under water pump vacuum. The amount of Poly DADMAC on the cellulose fibers was determined to be 1.08% of the weight of the cellulose fibers by Kjeldahl method of nitrogen determination.

Experiment 5

Surface Treatment of Unbleached Cellulose Fibers

Cellulose Fibers Treated in Water
1. with fibrillated CMC fibers (0.45 DS) (2% of cellulose fiber weight) and then
2. with Poly DADMAC (100,000-200,000 Mw) (2.4% of cellulose fiber weight).

2.0 g (oven dry basis) of CMC was added to 1500 ml de-ionized water in a 3000 ml stainless steel beaker. The stainless steel beaker was placed in a constant temperature water bath and the CMC was mixed using an overhead air mixer. The CMC dispersion was heated to and maintained at 80° C. in the water bath. Mixing was for one hour.

Then 100 g OD ML1 unbleached cellulose wood pulp fibers in 400 ml DI water was added to the stainless steel beaker and mixed for 30 minutes. Temperature during mixing was maintained at 80° C.

Then 12.0 g of 20% stock solution Poly DADMAC (2.4 g Poly DADMAC) purchased from Sigma-Aldrich diluted with 500 ml of DI water was added to the beaker and mixed for one hour. The temperature during mixing was maintained at 80° C. The fibers were filtered using a Buchner funnel/flask under water pump vacuum. The amount of Poly DADMAC on the cellulose fibers was determined to be 1.15% of the weight of the cellulose fibers by Kjeldahl method of nitrogen determination.

5.0 g of the treated wet pulp fibers was added to 5000 ml DI water and mixed for 30 minutes using overhead mixing. The fibers were filtered using a Buchner funnel/flask under water pump vacuum. The amount of Poly DADMAC on the cellulose fibers was determined to be 0.87% of the weight of the cellulose fibers by Kjeldahl method of nitrogen determination.

Another 5.0 g of the treated wet pulp fibers was added in 5000 ml NaOH solution (pH=12) and mixed for 30 minutes using overhead mixing. The fibers were filtered using a Buchner funnel/flask under water pump vacuum. The amount of Poly DADMAC on the cellulose fibers was determined to be 1.04% of the weight of the cellulose fibers by Kjeldahl method of nitrogen determination.

Experiment 6

Surface Treatment of Unbleached Cellulose Fibers

Cellulose Fibers Treated in Water
1. with fibrillated CMC fibers (0.45 DS) (1% of cellulose fiber weight) and then
2. with Poly DADMAC (100,000-200,000 Mw) (3.0% of cellulose fiber weight).

1.0 g (oven dry basis) CMC (DS=0.45) was added to 1500 ml de-ionized water in a 3000 ml stainless steel beaker. The stainless steel beaker was placed in a constant temperature water bath and the CMC dispersion was mixed using an overhead air mixer. The CMC dispersion was heated to and maintained at a temperature of 80° C. in the water bath. Mixing was for one hour.

Then 100 g OD ML1 unbleached cellulose wood pulp fibers in 400 ml DI water was added to the stainless steel beaker and mixed for 30 minutes. The temperature was maintained at 80° C.

Then 15.0 g of 20% stock solution Poly DADMAC (3.0 g Poly DADMAC) purchased from Sigma-Aldrich diluted with 500 ml of DI water was added to the beaker and mixed for one hour. The temperature was maintained at 80° C. during mixing. The fibers were filtered using a Buchner funnel/flask under water pump vacuum. The amount of Poly DADMAC on the cellulose fibers was determined to be 1.10% of the weight of the cellulose fibers by Kjeldahl method of nitrogen determination.

5.0 g of the treated wet pulp fibers was added to 5000 ml DI water and mixed for 30 minutes using overhead mixing. The fibers were filtered using a Buchner funnel/flask under water pump vacuum. The amount of Poly DADMAC on the cellulose fibers was determined to be 0.76% of the weight of the cellulose fibers by Kjeldahl method of nitrogen determination.

Another 5.0 g of the treated wet pulp fibers was added to 5000 ml of an NaOH solution (pH=12) and mixed for 30 minutes using overhead mixing. The fibers were filtered using a Buchner funnel/flask under water pump vacuum. The amount of Poly DADMAC on the cellulose fibers was determined to be 0.95% of the weight of the cellulose fibers by Kjeldahl method of nitrogen determination.

Experiment 7

Surface Treatment of Unbleached Cellulose Fibers

Cellulose Fibers Treated in Water
1. with fibrillated CMC fibers (0.45 DS) (1% of cellulose fiber weight) and then
2. with Poly DADMAC (100,000-200,000 Mw) (2.4% of cellulose fiber weight).

1.0 g (oven dry basis) of CMC (DS=0.45) was added to 1500 ml de-ionized water in a 3000 ml stainless steel beaker. The stainless steel beaker was placed in a constant temperature water bath and the CMC and water were mixed using an overhead air mixer. The CMC dispersion was heated to and maintained at a temperature of 80° C. in the water bath. Mixing was for one hour.

Then 100 g OD ML1 unbleached cellulose wood pulp fibers in 400 ml DI water was added to the stainless steel beaker and mixed for 30 minutes. The temperature was maintained at 80° C.

Then 12.0 g of 20% stock solution Poly DADMAC (2.4 g Poly DADMAC) purchased from Sigma-Aldrich diluted with 500 ml of DI water was added to the beaker and mixed with the other ingredients. Mixing was for one hour. Mixing was at 80° C. The fibers were filtered using a Buchner funnel/flask under water pump vacuum. The amount of Poly DADMAC on the cellulose fibers was determined to be 0.98% of the weight of the cellulose fibers by Kjeldahl method of nitrogen determination.

5.0 g of the treated wet pulp fibers were added to 5000 ml DI water and mixed for 30 minutes using overhead mixing. The fibers were filtered using a Buchner funnel/flask under water pump vacuum. The amount of Poly DADMAC on the cellulose fibers was determined to be 0.76% of the weight of the cellulose fibers by Kjeldahl method of nitrogen determination.

Another 5.0 g of the treated wet pulp fibers was added to 5000 ml NaOH solution (pH=12) and mixed for 30 minutes using overhead mixing. The fibers were filtered using a Buchner funnel/flask under water pump vacuum. The amount of Poly DADMAC on the cellulose fibers was determined to be 0.88% of the weight of the cellulose fibers by Kjeldahl method of nitrogen determination.

Experiment 8

Surface Treatment of Unbleached Refined Cellulose Fibers (CSF=150)

Cellulose Fibers Treated in Water
1. with fibrillated CMC fibers (0.45 DS) (4% of cellulose fiber weight) and then
2. with Poly DADMAC (100,000-200,000 Mw) (2.4% of cellulose fiber weight).

4.0 g (oven dry basis) of CMC (DS=0.45) was added to 1500 ml de-ionized water in a 3000 ml stainless steel beaker. The stainless steel beaker was placed in a constant temperature water bath and the CMC and water were mixed using an overhead air mixer. The CMC dispersion was heated to and maintained at a temperature of 80° C. in the water bath. Mixing was for one hour.

Then 100 g OD ML1 unbleached cellulose wood pulp fibers refined fibers (150 CSF) in 400 ml DI water were added to the stainless steel beaker and mixed with the CMC dispersion for 30 minutes. The temperature was maintained at 80° C. during mixing.

Then 12.0 g of 20% stock solution of Poly DADMAC (2.4 g Poly DADMAC) purchased from Sigma-Aldrich diluted with 500 ml of DI water was added to the dispersion and mixing was continued for one hour. The temperature was maintained at 80° C. The fibers were filtered using a Buchner funnel/flask under water pump vacuum. The amount of Poly DADMAC on the cellulose fibers was determined to be 1.78% of the weight of the cellulose fibers by Kjeldahl method of nitrogen determination.

5.0 g of the treated wet pulp fibers were added to 5000 ml DI water and mixed for 30 minutes using overhead mixing. The fibers were filtered using a Buchner funnel/flask under water pump vacuum. The amount of Poly DADMAC on the cellulose fibers was determined to be 1.58% of the weight of the cellulose fibers by Kjeldahl method of nitrogen determination.

Another 5.0 g of the treated wet pulp fibers was added to 5000 ml NaOH solution (pH=12) and mixed for 30 minutes using overhead mixing. The fibers were filtered using a Buchner funnel/flask under water pump vacuum. The amount of Poly DADMAC on the cellulose fibers was determined to be 1.78% of the weight of the cellulose fibers by Kjeldahl method of nitrogen determination.

Experiment 9

Surface Treatment of Partially Bleached Cellulose Fibers

Cellulose Fibers Treated in Water
1. with fibrillated CMC fibers (0.45 DS) (4% of cellulose fiber weight) and then
2. with Poly DADMAC (100,000-200,000 Mw) (2.4% of cellulose fiber weight).

4.0 g (oven dry basis) of CMC (DS=0.45) was added to 1500 ml de-ionized water in a 3000 ml stainless steel beaker. The stainless steel beaker was placed in a constant temperature water bath and the CMC and water were mixed using an overhead air mixer. The CMC dispersion was heated to and maintained at a temperature of 80° C. in the water bath. Mix was for one hour.

Then 100 g OD partially bleached cellulose wood pulp fibers in 400 ml DI water was added to the dispersion in the stainless steel beaker and mixed for 30 minutes. The temperature was maintained at 80° C. during mixing.

Then 12.0 g of 20% stock solution Poly DADMAC (2.4 g Poly DADMAC) purchased from Sigma-Aldrich diluted with 500 ml of DI water was added to the dispersion in the beaker and mixed for one hour. The temperature was 80° C. The fibers were filtered using a Buchner funnel/flask under water pump vacuum. The amount of Poly DADMAC on the cellulose fibers was determined to be 1.96% of the weight of the cellulose fibers by Kjeldahl method of nitrogen determination.

5.0 g of the treated wet pulp fibers was added to 5000 ml DI water and mixed for 30 minutes using overhead mixing. The fibers were filtered using a Buchner funnel/flask under water pump vacuum. The amount of Poly DADMAC on the cellulose fibers was determined to be 1.61% of the weight of the cellulose fibers by Kjeldahl method of nitrogen determination.

Another 5.0 g of the treated wet pulp fibers was added to 5000 ml NaOH solution (pH=12) and mixed for 30 minutes using overhead mixing. The fibers were filtered using a Buchner funnel/flask under water pump vacuum. The amount of Poly DADMAC on the cellulose fibers was determined to be 1.96% of the weight of the cellulose fibers by Kjeldahl method of nitrogen determination.

Experiment 10

Surface Treatment of Partially Bleached Cellulose Fibers

Cellulose Fibers Treated in Water
1. with fibrillated CMC fibers (0.27 DS) (4% of cellulose fiber weight) and then
2. with Poly DADMAC (100,000-200,000 Mw) (2.4% of cellulose fiber weight).

4.0 g (oven dry basis) of CMC (DS=0.27) was added to 1500 ml de-ionized water in a 3000 ml stainless steel beaker. The stainless steel beaker was placed in a constant temperature water bath and the CMC and water was mixed using an overhead air mixer. The CMC and water dispersion was heated to and maintained at a temperature of 80° C. in the water bath. Mixing was for one hour.

Then 100 g OD partially bleached cellulose wood pulp fibers in 400 ml DI water was added to the CMC dispersion in the stainless steel beaker and mixed for 30 minutes. The temperature was maintained at 80° C. during mixing.

Then 12.0 g of 20% stock solution Poly DADMAC (2.4 g Poly DADMAC) purchased from Sigma-Aldrich diluted with 500 ml of DI water was added to the mixture in the beaker and mixed for one hour. The temperature was maintained at 80° C. during mixing. The fibers were filtered using a Buchner funnel/flask under water pump vacuum. The amount of Poly DADMAC on the cellulose fibers was determined to be 1.73% of the weight of the cellulose fibers by Kjeldahl method of nitrogen determination.

5.0 g of the treated wet pulp fibers were added to 5000 ml DI water and mixed for 30 minutes using overhead mixing. The fibers were filtered using a Buchner funnel/flask under water pump vacuum. The amount of Poly DADMAC on the cellulose fibers was determined to be 1.38% of the weight of the cellulose fibers by Kjeldahl method of nitrogen determination.

Another 5.0 g of the treated wet pulp fibers was added to 5000 ml NaOH solution (pH=12) and mixed for 30 minutes using overhead mixing. The fibers were filtered using a Buchner funnel/flask under water pump vacuum. The amount of Poly DADMAC on the cellulose fibers was determined to be 1.61% of the weight of the cellulose fibers by Kjeldahl method of nitrogen determination.

Experiment 11

Surface Treatment of Partially Bleached Cellulose Fibers

Cellulose Fibers Treated in Water
1. with fibrillated CMC fibers (0.38 DS) (4% of cellulose fiber weight) and then
2. with Poly DADMAC (100,000-200,000 Mw) (2.4% of cellulose fiber weight).

4.0 g (oven dry basis) of CMC (DS=0.38) was added to 1500 ml de-ionized water in a 3000 ml stainless steel beaker. The stainless steel beaker was placed in a constant temperature water bath and the CMC and water was mixed using an overhead air mixer. The CMC dispersion was heated to and maintained at a temperature of 80° C. in the water bath. Mix was for one hour.

Then 100 g OD partially bleached cellulose wood pulp fibers in 400 ml DI water was added to the stainless steel beaker and mixed for 30 minutes. The temperature was maintained at 80° C. during mixing.

Then 12.0 g of 20% stock solution of Poly DADMAC (2.4 g Poly DADMAC) purchased from Sigma-Aldrich diluted with 500 ml of DI water was added to the mixture in the beaker and mixed for one hour. The temperature was maintained at 80° C. The fibers were filtered using a Buchner funnel/flask under water pump vacuum. The amount of Poly DADMAC on the cellulose fibers was determined to be 1.84% of the weight of the cellulose fibers by Kjeldahl method of nitrogen determination.

5.0 g of the treated wet pulp fibers was added to 5000 ml DI water and mixed for 30 minutes using overhead mixing. The fibers were filtered. The amount of Poly DADMAC on the cellulose fibers was determined to be 1.61% of the weight of the cellulose fibers by Kjeldahl method of nitrogen determination.

Another 5.0 g of the treated wet pulp fibers were added to 5000 ml NaOH solution (pH=12) and mixed for 30 minutes using overhead mixing. The fibers were filtered. The amount of Poly DADMAC on the cellulose fibers was determined to be 1.73% of the weight of the cellulose fibers by Kjeldahl method of nitrogen determination.

Experiment 12

Surface Treatment of Partially Delignified Catalytically Carboxylated Cellulose Fibers Catalytically Carboxylated Ellulose Fibers Treated in Water
1. with Poly DADMAC (100,000-200,000 Mw) (2.4% of cellulose fiber weight).

Dispersed catalytically carboxylated partially delignified cellulose pulp fibers 50.0 g OD with a carboxyl level of 17.87 meq/100 g) in 750 ml of de-ionized in a 3000 ml stainless steel beaker. Place the stainless steel beaker in a water bath and continued mixing with an overhead air mixer. The pulp slurry was maintained at a temperature of 55° C. in the water bath.

Then poly DADMAC 6.0 g of 20% stock solution purchased from Sigma-Aldrich diluted with 250 ml of DI water was added to the catalytically carboxylated fibers. After one hour mixing at 55 C, fibers were filtered using a Buchner funnel/flask under water pump vacuum. The amount of Poly DADMAC on the cellulose fibers was determined to be 1.97% of the weight of the cellulose fibers by Kjeldahl method of nitrogen determination.

5.0 g OD wet pulp was then dispersed in 5000 ml (pH=12) NaOH solution for 30 minutes with overhead mixing. The fibers were filtered using a Buchner funnel/flask under water pump vacuum. The amount of Poly DADMAC on the cellulose fibers was determined to be 1.76% of the weight of the cellulose fibers by Kjeldahl method of nitrogen determination.

TABLE 2

| Sample | Low DS CMC (DS = 0.45) % applied on fibers | Poly DADMAC (Aldrich) (MW = 100,000-200,000) % applied on fibers | Poly DADMAC (Aldrich) (MW = 100,000-200,000) % retained on fibers |
|---|---|---|---|
| 1 153316-30 | 4% | 2.4% | 1.76% |
| 15316-30A (alkaline wash) | 4% | 2.4% | 1.61% |
| 15316-30B (pH = 6 DI water wash) | 4% | 2.4% | 1.38% |
| 2 15316-31 | 4% | 1.2% | 0.77% |
| 15316-31A (pH = 6 DI water wash) | 4% | 1.2% | 0.50% |
| 15316-31B (alkaline wash) | 4% | 1.2% | 0.50% |
| 3 15316-36 | 2% | 1.2% | 0.68% |
| 15316-36A (pH = 6 DI water wash) | 2% | 1.2% | 0.58% |
| 15316-36B (alkaline wash) | 2% | 1.2% | 0.54% |
| 4 15316-37 | 2% | 3% | 1.15% |
| 15316-37A (pH = 6 DI water wash) | 2% | 3% | 0.86% |
| 15316-37B (alkaline wash) | 2% | 3% | 1.08% |
| 5 15316-33 | 2% | 2.4% | 1.15% |
| 15316-33A (pH = 6 DI water wash) | 2% | 2.4% | 0.87% |
| 15316-33B (alkaline wash) | 2% | 2.4% | 1.04% |
| 6 15316-41 | 1% | 3% | 1.10% |
| 15316-41A (pH = 6 DI water wash) | 1% | 3% | 0.76% |
| 15316-41B (alkaline wash) | 1% | 3% | 0.95% |
| 7 15316-42 | 1% | 2.4% | 0.98% |
| 15316-42A (pH = 6 DI water wash) | 1% | 2.4% | 0.76% |
| 15316-42B (alkaline wash) | 1% | 2.4% | 0.88% |
| 8 | 4% | 2.4% | 1.78% |
| (pH = 6 DI water wash) | 4% | 2.4% | 1.58% |
| (alkaline wash) | 4% | 2.4% | 1.78% |
| 9 | 4% | 2.4% | 1.96% |
| (pH = 6 DI water wash) | 4% | 2.4% | 1.61% |
| (alkaline wash) | 4% | 2.4% | 1.96% |
| 10 | 4% | 2.4% | 1.73% |
| (pH = 6 DI water wash) | 4% | 2.4% | 1.38% |
| (alkaline wash) | 4% | 2.4% | 1.61% |
| 11 | 4% | 2.4% | 1.84% |
| (pH = 6 DI water wash) | 4% | 2.4% | 1.61% |
| (alkaline wash) | 4% | 2.4% | 1.73% |

The invention claimed is:

1. A naturally cured fiber-cement product comprising cement and a treated cellulose wood pulp fiber, the fiber being treated with fibrillated carboxymethyl cellulose or a carboxyethyl cellulose with a low degree of substitution, DS of 0.01 to 0.45, and then with poly(diallyldimethyl ammonium)chloride.

2. The fiber-cement product of claim 1 in which the fiber is an unbleached fiber.

3. The fiber-cement product of claim 1 in which the fiber is a partially bleached fiber.

4. The fiber-cement product of claim 1 in which the fiber is an unrefined fiber.

5. The fiber-cement product of claim 1 in which the fiber is a refined fiber.

6. The fiber cement product of claim 1 in which the fiber is a mixture of refined and unrefined fiber.

* * * * *